United States Patent [19]

Blanford

[11] Patent Number: 4,868,375
[45] Date of Patent: Sep. 19, 1989

[54] METHOD FOR CHANGING THE FUNCTIONS OF A BAR CODE READER

[75] Inventor: Denis M. Blanford, Cambridge, Ohio

[73] Assignee: NCR Corporation, Dayton, Ohio

[21] Appl. No.: 234,666

[22] Filed: Aug. 22, 1988

[51] Int. Cl.⁴ .............................................. G06K 7/10
[52] U.S. Cl. ..................................... 235/462; 235/463
[58] Field of Search ................................ 235/462, 463

[56] References Cited

U.S. PATENT DOCUMENTS

| | | | |
|---|---|---|---|
| 3,924,108 | 12/1975 | Nakamura | 235/152 |
| 4,091,270 | 5/1978 | Musch | 235/462 |
| 4,220,991 | 9/1980 | Hamano et al. | 364/405 |
| 4,253,018 | 2/1981 | Amacher et al. | 235/463 |
| 4,272,675 | 6/1981 | Blanford et al. | 235/463 |
| 4,275,380 | 6/1981 | Gardner et al. | 340/146.3 |
| 4,282,426 | 8/1981 | Neseem et al. | 235/463 |
| 4,287,507 | 9/1981 | Janes et al. | 340/146.3 |
| 4,328,544 | 5/1982 | Baldwin et al. | 364/405 |
| 4,415,065 | 11/1983 | Sandstedt | 186/39 |
| 4,503,503 | 3/1985 | Suzuki | 364/405 |
| 4,518,852 | 5/1985 | Stockburger et al. | 235/381 |
| 4,679,154 | 7/1987 | Blanford | 364/525 |
| 4,694,725 | 9/1987 | Seevers et al. | 84/1.27 |
| 4,729,097 | 3/1988 | Takaoka et al. | 364/405 |

Primary Examiner—Harold I. Pitts
Attorney, Agent, or Firm—Wilbert Hawk, Jr.; Albert L. Sessler, Jr.

[57] ABSTRACT

A bar code reader is provided with the capability of reading bar code symbols containing information for causing changes in the functions performed by said reader, as well as reading merchandise identification symbols commonly associated with items such as merchandise being checked out at a point of sale terminal. Tests are provided to determine that the bar code symbols for function changes are proper symbols, and are not merchandise identification symbols, such as UPC symbols.

17 Claims, 4 Drawing Sheets

METHOD FOR CHANGING THE FUNCTIONS OF A BAR CODE READER

BACKGROUND OF THE INVENTION

The use of symbols or labels which comprise bar codes as a means for identifying data which is used in processing items sold in the retail industry, and for other purposes as well, has been widely accepted. A particular bar code, known as the Universal Product Code (UPC), has been established as the industry standard for the grocery and other related retail industries. In a multiple bar code, such as the UPC, each decimal number or character is represented by two pairs of vertical bars and spaces within a seven-bit pattern wherein a binary one bit is represented by a dark module or bar of a predetermined width and a binary zero is represented by a light module or space. Thus, for example, the decimal or character one may be represented in the UPC code by the seven-bit pattern 0011001. In keeping with the format, the decimal one would be comprised of an initial space of a two-bit width, followed by a two-bit wide bar, another two-bit space and a one-bit wide bar. For each character or decimal of the system, there are two bars and two spaces which have a total width of seven modules or bits. The width of each of the bars or spaces which comprise a character may be one, two, three or four modules wide, so long as the sum of the bars and spaces is seven bits or modules wide.

In present day merchandise checkout systems, the use of optical scanners or readers for scanning the UPC labels on purchased merchandise items has become quite common. In the checkout systems in use today, the optical reader can take the form of a reader mechanism located in a checkout counter, or the form of a hand-held wand. In either case, the optical reader will scan the bar code pattern that forms the UPC label, and will generate signals representing the bars and spaces of the pattern for transmission to a processor which determines the character represented by the bar code pattern. The character which identifies the purchased items is then transmitted to an associated data terminal device and from there to a remote or back office processor which looks up the price of the item in a table located in the processor. The price is then transmitted back through the terminal device, where the price is printed on a receipt by a printer mechanism located in the terminal device, and then to a customer display member located adjacent to the checkout counter where the price of the item is displayed. If an error occurs due to a malfunction of the printer or if the price of the item is not listed in the price-lookup table, error signals are generated, notifying the operator to take appropriate actions to correct the situation.

Means are customarily provided for altering error signals and other signals generated by the reader, and for altering other functions of the reader. For example, due to ambient noise conditions, it may be desirable to alter the volume, frequency or duration of an audible signal indicating that an acceptable scanning operation has been performed on the symbol being scanned.

In the past, the alteration of such functions has often involved the services of an equipment technician, since such alterations customarily involved operations of some complexity, such as the changing of switch settings within the reader, or by the making of software changes, which would differ depending upon the type of reader which was attached to the system.

It would be desirable to provide a method for alteration of reader functions which is simple and effective and does not require the services of a technician for accomplishment.

SUMMARY OF THE INVENTION

This invention relates to a method for changing the functions of a bar code reader, and more particularly relates to such a method which uses the scanning of bar codes to effect such changes.

In accordance with one embodiment of the invention, a method for changing a function of a bar code reader, which is capable of reading data code symbols, by reading of a bar code reader function symbol, comprises the following steps: scanning a bar code symbol; determining whether the scanned bar code symbol has been properly sensed; determining whether a properly sensed bar code symbol possesses a certain characteristic which identifies it as not being a data code symbol; determining whether a sensed bar code symbol which is not a data code symbol is a bar code reader function symbol; identifying the specific reader function encoded in a sensed bar code reader function symbol; and performing the encoded function.

It is accordingly an object of the present invention to provide a simple, effective method for changing the functions of a bar code reader.

Another object is to provide a method for changing the functions of a bar code reader which involves sensing a bar code reader function symbol.

Another object is to provide a method for changing the functions of a bar code reader which involves sensing a bar code reader function symbol, distinguishing said bar code reader function symbol from a data code symbol, determining the legitimacy of said bar code reader function symbol, and changing the function of the bar code reader in accordance with the information contained in the bar code reader function symbol.

With these and other objects, which will become apparent from the following description, in view, the invention includes certain novel features of construction and combinations of parts, and of a process, a preferred form or embodiment of which is hereinafter described with reference to the drawings which accompany and form a part of this specification.

DESCRIPTION OF THE PREFERRED EMBODIMENT

Figure 5:
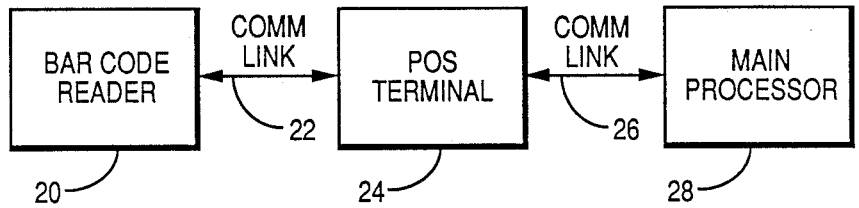
FIG. 5 is a block diagram of a system including a bar code reader, a point of sale terminal and a main processor.
Figure 3A:
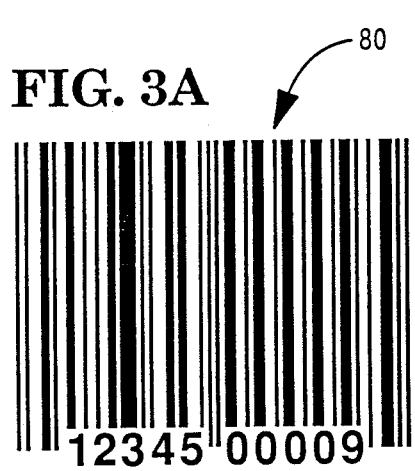
FIGS. 3A to 3F inclusive are representations of various bar code reader function symbols.
Figure 3B:
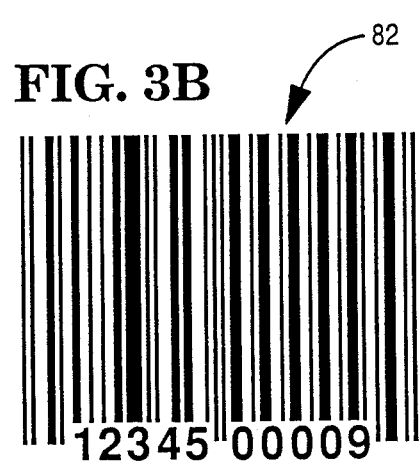
Figure 3C:
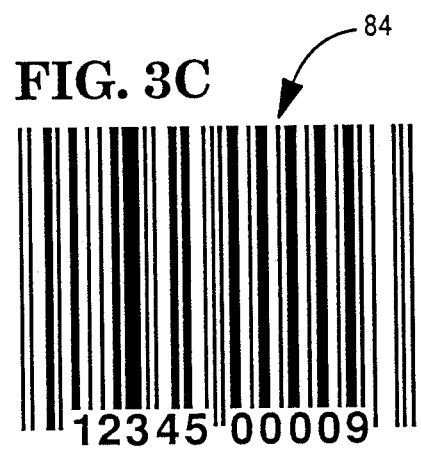
Figure 3D:
Figure 3E:
Figure 3F:

Referring now to FIG. 5, there is shown a block diagram of a checkout system which may embody the present invention. This system includes a bar code reader 20 for scanning a coded label on a purchased merchandise item and for generating coded signals representing the identity of the purchased item. These signals are transmitted over a communications link 22 to a terminal device 24, shown here as a point of sale terminal, which in turn transmits the signals over a further communications link 26 to a main processor 28. The processor 28, utilizing the signals received, determines the price of the purchased item from a price look-up table stored in the processor 28. The numerical data representing the price is transmitted over the communications link 26 to the terminal device 24 which prints the price on a receipt. The data may also be transmitted over the communications link 22 to the reader 20 which actuates a customer display to display the price of the item purchased to the customer. The bar code reader is not limited to use in merchandise systems, as it may be used in a wide variety of other applications, such as the checking in and out of library books and other materials, for example.

Figure 4:
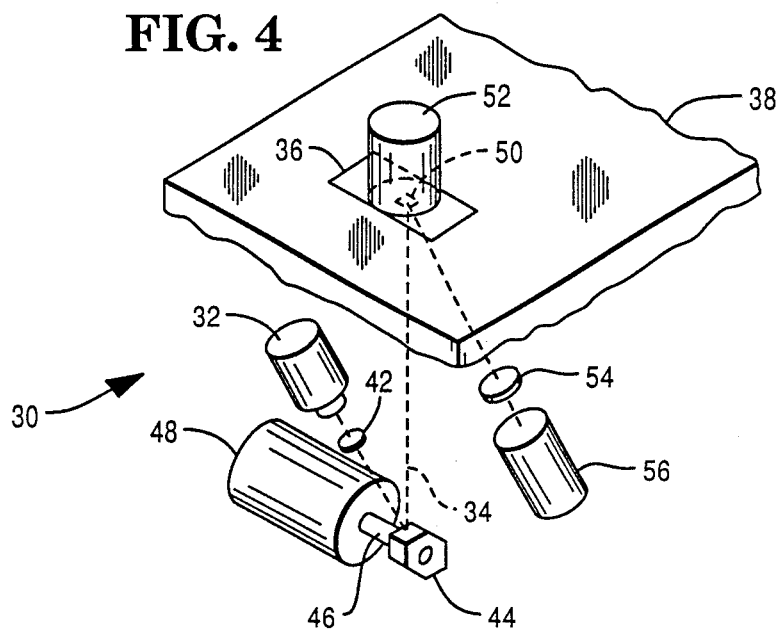
FIG. 4 is a fragmentary perspective view of the mechanical elements of a bar code reader.

Referring now to FIG. 4, there is shown a perspective view of the mechanical structure of the bar code reader 20 which includes a scanner assembly generally indicated by the numeral 30, comprising a light source 32 emitting an optical scanning light beam 34 in the visible or near visible spectrum, the light beam being directed through an aperture 36 located in a supporting surface 38 of a checkout counter 40. The light source 32 may be a helium or neon laser that is pumped to produce a continuous laser beam of red monochromatic light of approximately 6,328 angstrom wave length.

Figure 6:
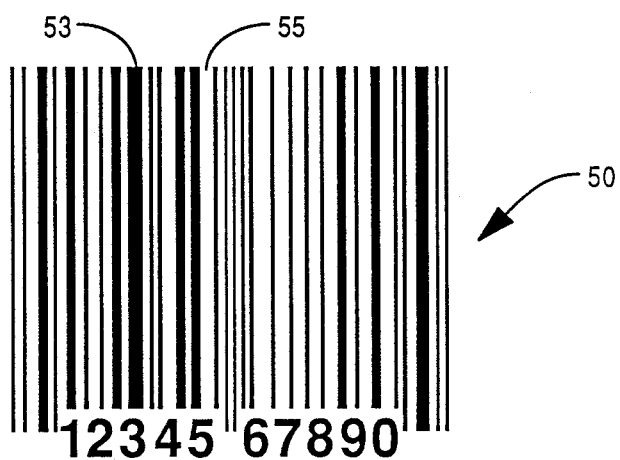
FIG. 6 is a representation of a UPC data symbol.

In a manner that is well-known in the art, the light beam 34 produced by the source 32 may be focused by a lens system 42 onto a multi-faced mirror 44. The mirror 44 is mounted on the shaft 46 of a motor 48 which rotates the mirror 44 at a substantially constant speed. The mirror 44 is positioned to intercept the light beam 34 and projects the same through the aperture 36 to scan the encoded indicia on a label 50 (FIG. 6) fixed to a merchandise item 52. As shown in FIG. 6, the encoded data on the label 50 comprises a plurality of black coded areas 53 and white coded areas 55 representing data concerning the identity of the merchandise item. The rotation of the mirror 44 causes a succession of light beams 34 to scan any encoded label 50 positioned over the aperture 36.

The light beam is reflected off the label 50 through an optical filter 54 to a photo-responsive pick-up device such as a photo-multiplier 56 which converts the reflected light beam into electrical signals, the amplitude of which correspond to the amounts of light received. Thus, the amplitude of the light reflected from the white coded areas 55 on the label 50 (FIG. 6) will be greater than the light reflected from the black coded areas 53. Conventional amplifying circuits will produce a relatively high voltage which can be assigned a binary one value when the beam 34 is scanning a black coded area 53 on the label and a relatively low voltage which can be assigned a binary zero value when the beam 34 is scanning a white coded area 55. Thus, the information contained on the label 50 can be decoded and used as an input to a processor for use in generating the price of the purchased item 52.

Figure 2:
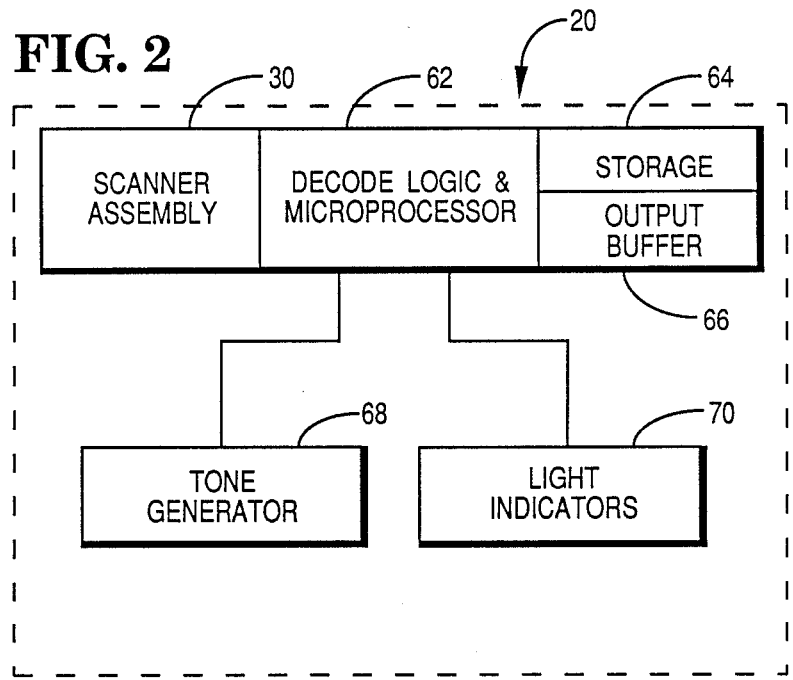
FIG. 2 is a block diagram of a bar code reader.

Referring now to FIG. 2, shown there is a partial block diagram of the bar code reader 20. The reader 20 includes the scanner assembly 30, a microprocessor 62 for checking and decoding the encoded data read by the scanner assembly 30, a conventional memory storage unit 64, an output buffer unit 66 for transmitting the data read by the scanner assembly 30 over the communication link 22 to a processor unit (not shown) in the POS terminal 24, a tone generator 68 and light indicators 70.

When the scanner assembly 30 reads a label 50 on a merchandise item 52 which is positioned adjacent the aperture 36, the serial data read is transmitted to the microprocessor 62. The microprocessor 62 will decode and check the received serial data to determine if the data is valid or not, will then generate control signals indicating a good or a bad read, and will transmit such signals to the tone generator 68 and to the light indicators 70 to cause said tone generator 68 and said light indicators 70 in the bar code reader 20 to be operated to provide appropriate indication to the operator of the terminal.

For a more detailed description of the bar code reader 20 and the bar code which is read, reference may be had to the following U.S. patents, which are assigned to the assignee of the present application: U.S. Pat. Nos. 4,253,018, issued Feb. 24, 1981; 4,272,675, issued June 9, 1981; 4,275,380, issued June 23, 1981; 4,282,426, issued Aug. 4, 1981; 4,287,507, issued Sept. 1, 1981; and 4,679,154, issued July 7, 1987.

As has been previously stated, in the present invention, the bar code reader 20 may also be used to read bar code labels which do not contain merchandise identification information, but instead contain information which is effective to alter certain functions performed by the bar code reader 20. It will be seen that the entry of function altering information or commands into the reader 20 by means of a scanning operation rather than by altering switch settings or reprogramming the reader 20 provides substantial advantages from the standpoint of time required and simplicity.

Referring to FIGS. 3A to 3F inclusive, shown there are six bar code labels 80, 82, 84, 86, 88 and 90, respectively, which, for example, may be used to perform six different changes in function of the bar code reader 20. Examination of these six labels which will hereinafter be collectively referred to as the function labels, and comparison of them with the merchandise identification label 50 of FIG. 6, will disclose certain common features, and certain areas of difference. For example, both the function labels and the merchandise identification label have a guard bar comprising two narrow dark bars with an intervening light space at both the left and right margins of the label. Both have a number system character comprising a light space and a relatively wide dark bar at the left side of the label inward from the left guard bar. Both have two five-digit character groupings with a center band pattern positioned therebetween. In the examples, the left character grouping comprises the same five characters (1 2 3 4 5) for all seven labels, although this would usually not be the case.

The difference between the function labels 80, 82, 84, 86, 88 and 90 on the one hand and the merchandise identification label 50 on the other hand, which enables the bar code reader 20 to distinguish between function labels and merchandise identification labels, resides in the character immediately to the left of the right-hand guard bar in all of these labels. In the merchandise identification label 50, this is a modulo check character, which is calculated in accordance with the other data characters included in the label to produce a check digit so that a mathematical operation involving all of the characters sensed from the label, including the check character, will always produce a final result having a certain characteristic. For example, the Universal Product Code employs a modulo 10 check for merchandise identification labels.

The function labels, on the other hand, are designed in terms of their character values so that they will not pass a modulo 10 check. In these labels, the character immediately to the left of the right-hand guard bar, in the same relative position as the module check character of the merchandise identification label, is used as part of the data which determines the particular function to be performed. In the labels illustrated in FIGS. 3A to 3F inclusive, this character is a 5 in FIG. 3A, a 4 in FIG. 3B, a 3 in FIG. 3C, a 2 in FIG. 3D, a 1 in FIG. E and a 0 in FIG. 3F.

Clearly the microprocessor 62 of the bar code reader 20 can be programmed to cause any suitable function to be altered in response to the reading of a given function character. Examples of functions which may be assigned to various function labels are tabulated below.

| LIST OF SPECIAL FUNCTION SYMBOLS | | |
|---|---|---|
| Function Label | UPC Version "A" Symbol No. | Function |
| 80 | 012345000095 | Reader Reset or make function changes permanent. |
| 82 | 012345000094 | Enter Diagnostic Mode. Exit by power down or reset symbol. |
| 84 | 012345000093 | Bad Tone Frequency Adjustment. Each scan will increase the bad tone frequency. There are eight different frequencies. Frequency will increase to highest and next scan will set to lowest. |
| 86 | 012345000092 | Good Tone Frequency Adjustment. Each scan will increase the good tone frequency. There are eight different frequencies. Frequency will increase to the highest and next scan will set to lowest. |
| 88 | 012345000091 | Good Tone Length Adjustment. Each scan will cause good tone length to increase by 15 milliseconds in the range of 0–225 milliseconds. |
| 90 | 012345000090 | Bad Tone Length Adjustment. Each scan will cause bad tone length to increase by 15 milliseconds in the range of 0–225 milliseconds. |

In the above listing, the bad tone and good tone frequency adjustments and the length adjustments relate to the tone generator 68 of FIG. 2.

It should be noted that the above list should not be construed as a complete list. Many other functions of a bar code reader or other apparatus could be controlled by a function symbol, such as enabling or disabling of the capability of reading different bar codes, changing bar code decode algorithms, and changing host interface logic to allow communication with a multitude of different host systems.

The bar code reader 20 can store the various function settings in a non-volatile memory, such as a battery-backed random access memory or an electrically erasable or programmable read only memory, in order to allow removal of power from the reader 20 while still maintaining the correct function settings.

Figure 1:
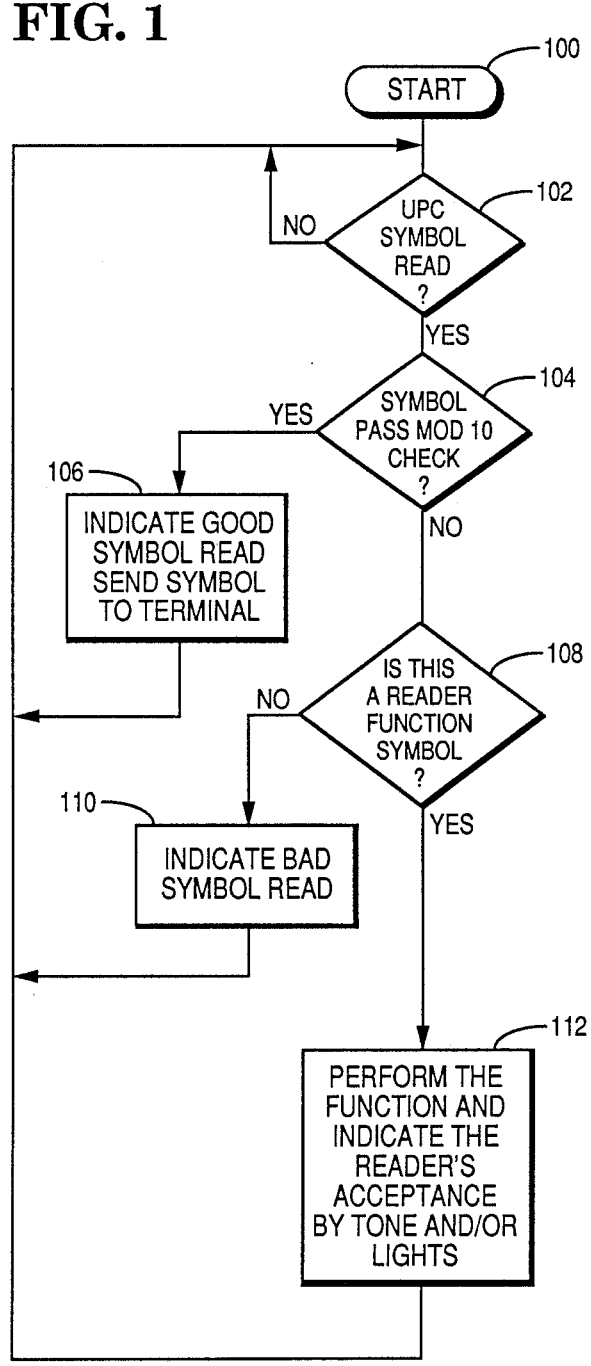
FIG. 1 is a flow diagram illustrating the method for changing the functions of a bar code reader.

Shown in FIG. 1 is a flow diagram representing the process through which functions of the bar code reader may be changed by scanning function labels such as those shown in FIGS. 3A to 3F inclusive.

Commencing with the start of the operation, which is represented by block 100, a function symbol, such as the symbol contained in label 80, is sensed by the scanning assembly 30 of the bar code reader 20. A determination is then made, as represented by block 102, as to whether or not a UPC symbol has been read, using criteria based upon UPC code standards. If not, the process returns to the start block 100.

Assuming that the reader 20 determines that a UPC symbol has been read, the reader 20 then examines the data scanned from the label which was read and determines whether the symbol passes a modulo 10 check and is therefore a legitimate merchandise identification symbol, as represented in block 104. If so, the reader 20 provides to the operator an indication that a good symbol reading has taken place, the data representing the symbol is sent to the terminal 24, as represented in block 106, and the process returns to the start block 100.

If the symbol does not pass the mod 10 check in block 104, the process continues to block 108, in which a determination is made as to whether or not the symbol being read is a reader function symbol, using criteria based upon common characteristics of the reader function codes. If the symbol is not a proper reader function code, the reader 20 provides to the operator an indication of this, as represented by block 110, and the process returns to the start block 100.

If the symbol being read is determined to be a proper reader function symbol, the process continues, as represented in block 112. The reader 20 performs the selected function, and indicates the reader's acceptance of this function to the operator by an appropriate indication, such as an audible tone, or the use of indicating lights. The process then returns to the start block 100, so that the reader 20 is prepared for sensing of the next symbol.

While the form of the invention illustrated and described herein is particularly adapted to fulfill the objects aforesaid, it is to be understood that other and further modifications within the scope of the following claims may be made without departing from the spirit of the invention.

I claim:

1. A method for changing a function of a bar code reader, which is capable of reading data code symbols, by reading of a bar code reader function symbol, comprising the following steps:

scanning a bar code symbol;

determining whether or not the scanned bar code symbol has been properly sensed;

determining whether a properly sensed bar code symbol possesses a certain characteristic which identifies it as not being a data code symbol;

determining whether a sensed bar code symbol which is not a data code symbol is a bar code reader function symbol;

identifying the specific reader function encoded in a sensed bar code reader function symbol; and performing the encoded function.

2. The method of claim 1 in which the function sensed is a bar code reader reset function.

3. The method of claim 1 in which the function sensed is a diagnostic function.

4. The method of claim 1 in which the function sensed is a bad tone frequency adjustment function.

5. The method of claim 4 in which multiple frequency adjustments may be made by repeated scanning of the bar code reader function symbol.

6. The method of claim 1 in which the function sensed is a good tone frequency adjustment function.

7. The method of claim 6 in which multiple frequency adjustments may be made by repeated scanning of the bar code reader function symbol.

8. The method of claim 1 in which the function sensed is a good tone length adjustment function.

9. The method of claim 8 in which the length may be adjusted by repeated scanning of the bar code reader function symbol.

10. The method of claim 1 in which the function sensed is a bad tone length adjustment function.

11. The method of claim 10 in which the length may be adjusted by repeated scanning of the bar code reader function symbol.

12. The method of claim 1 in which a plurality of function bar code symbols are placed on a record member together with identifying indicia so that the desired symbol can be selected and sensed by an operator.

13. The method of claim 1 in which nonvolatile memory means are provided in the bar code reader in order to allow removal of power from the reader while still maintaining the correct function setting.

14. The method of claim 1 in which the data code symbol is a universal product code symbol.

15. The method of claim 1, also including the step of indicating the acceptance of the sensed bar code reader function symbol.

16. The method of claim 1, in which the characteristic of a bar code reader function which identifies it as not being a data code symbol is that its components do not have a mod 10 value after predetermined mathematical operations.

17. A method for changing the function of a bar code reader, capable of reading data code symbols, by reading of a bar code reader function symbol, comprising the following steps:
    sensing a bar code reader function symbol;
    distinguishing said bar code reader function symbol from a data code symbol;
    determining the legitimacy of said bar code reader function symbol; and
    changing the function of the bar code reader in accordance with the information contained in the bar code reader function symbol.

* * * * *